(12) United States Patent
Michaely et al.

(10) Patent No.: US 9,952,833 B2
(45) Date of Patent: *Apr. 24, 2018

(54) AUTOMATED MODIFICATION INTEGRATION AND CONFLICT RESOLUTION FOR SOFTWARE DEVELOPMENT

(71) Applicant: Microsoft Technology Licensing, LLC, Redmond, WA (US)

(72) Inventors: Nir Michaely, Redmond, WA (US); Cherno Jagne, Bothell, WA (US); Nick Yu, Oakland, CA (US); Viraf Gandhi, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/836,737

(22) Filed: Aug. 26, 2015

(65) Prior Publication Data

US 2015/0363172 A1 Dec. 17, 2015

Related U.S. Application Data

(63) Continuation of application No. 13/100,467, filed on May 4, 2011, now Pat. No. 9,128,805.

(51) Int. Cl.
*G06F 9/44* (2006.01)
*G06F 9/45* (2006.01)

(52) U.S. Cl.
CPC ............... *G06F 8/30* (2013.01); *G06F 8/40* (2013.01); *G06F 8/71* (2013.01)

(58) Field of Classification Search
None
See application file for complete search history.

(56) References Cited

U.S. PATENT DOCUMENTS 4,558,413 A 12/1985 Schmidt et al.
5,675,802 A 10/1997 Allen et al.
(Continued)

OTHER PUBLICATIONS

"Final Office Action Issued in U.S. Appl. No. 13/100,467", dated Oct. 25, 2013, 15 Pages.
(Continued)

*Primary Examiner* — Qamrun Nahar
(74) *Attorney, Agent, or Firm* — Davin Chin; Chin IP, PLLC

(57) ABSTRACT

Proposed changes to a source code generated by client computing devices are integrated with a master version of the code resident on a server computing system remote from the client devices. The client devices connect to the server system over a network and transmit proposed changes to the server system, where resident integration/conflict resolution software automatically integrates the proposed changes into the master version. Any unresolved conflicts remaining after the automatic integration are identified and the server system automatically sends an email notifying the one or more client devices that there are unresolved conflicts. The email includes a link that enables a client device to launch a window on a monitor, and the client device user employs the window to transmit commands directly to and receive further communications directly from the integration/conflict resolution software in an interactive operation to attempt to manually resolve the conflicts.

20 Claims, 5 Drawing Sheets

(56) References Cited

U.S. PATENT DOCUMENTS

| | | | |
|---|---|---|---|
| 6,757,893 B1* | 6/2004 | Haikin | G06F 8/71 717/170 |
| 6,993,759 B2 | 1/2006 | Aptus et al. | |
| 7,680,932 B2 | 3/2010 | Defaix et al. | |
| 8,108,464 B1* | 1/2012 | Rochelle | G06Q 10/107 709/204 |
| 2008/0072217 A1 | 3/2008 | Li et al. | |

OTHER PUBLICATIONS

"Non-Final Office Action Issued in U.S. Appl. No. 13/100,467", dated Mar. 29, 2013, 11 Pages.
"Non-Final Office Action Issued in U.S. Appl. No. 13/100,467", dated Dec. 22, 2014, 13 Pages.
"Notice of Allowance Issued in U.S. Appl. No. 13/100,467", dated May 1, 2015, 8 Pages.
Cyca et al., "Application of the Concurrent Versions System (CVS) in the Design and Implementation of an Embedded Multichannel Data Acquisition and Analysis System for Gastrointestinal Signals", Retrieved at <<http://www.inf.unibz.it/~gsucci/publications/images/applicationofthecvs.pdf>>, International Journal of Information Theory and Applications, 2000, vol. 7, pp. 1-9.
Fowler, Martin, "Continuous Integration", Retrieved at <<http://martinfowler.com/articles/continuousIntegration.html>>, May 1, 2006, pp. 12.

* cited by examiner

AUTOMATED MODIFICATION INTEGRATION AND CONFLICT RESOLUTION FOR SOFTWARE DEVELOPMENT

CROSS-REFERENCE TO RELATED APPLICATION(S)

This application is a continuation of U.S. patent application Ser. No. 13/100,467, filed May 4, 2011, entitled "AUTOMATED MODIFICATION INTEGRATION AND CONFLICT RESOLUTION FOR SOFTWARE DEVELOPMENT". The entirety of this afore-mentioned application is incorporated herein by reference.

BACKGROUND

Current computer software code, such as source code for operating systems and multipurpose applications, is very complex and can comprise thousands of lines. In addition, common computer languages use routines and subroutines that are interrelated in complex ways to effect operations that the software is intended to perform. These factors and others make it a practical impossibility for one person to write such code, or even for a handful of people to collaborate as an organic whole to write it. Accordingly, it is common practice for a large number of individual software developers, usually working in plural teams, to be responsible for different functional parts (sometimes referred to as "branches") of the code.

One typical way this is handled is to have a master version of the entire code in a secure repository, such as a server computer, and to have the individuals and/or teams developing the code work against this master version. The master version can be made available to the developers working on the code, such as by lodging a copy of it on the computer workstation of each developer. The developers' workstations have resident software that enables them to write new lines of code for addition to the master version or to revise existing lines of code. Developers, whether individuals or teams, can then transmit their proposed changes to the server computer on which the master version resides for possible incorporation into the master version ("reverse integration"). The server computer includes resident software that automatically integrates proposed changes into the master version and also determines if the proposed changes would cause any conflicts either among the changes or with the existing master version of the code. (As used herein, the term "conflict" generally refers to a situation in which a particular line or section of code, when executed, would impair or prevent execution of other lines or sections of the code.) Many companies that develop software, particularly large organizations, use proprietary integration/conflict resolution software, but there are commercially available versions of such software that are entirely suitable for the purpose, an example being the Team Foundation Server collaborative software development application available from Microsoft Corporation, the assignee of the present application.

In any case, if such software cannot automatically resolve a potential conflict that would be caused by integrating proposed changes/additions into the master version of a code being developed, the various developers must collaborate to resolve the conflict. Once that is accomplished, the new master version is provided to the developers and/or teams ("forward integration") for further additions and/or revisions as development of the code continues.

Although this paradigm has been used successfully to write code for numerous software products, it is fairly cumbersome and generally requires a large number of communications and/or meetings among the various individual developers and teams to carry out periodic forward and reverse integrations to resolve potential conflicts that would result from proposed changes and thereby permit the code to be completed. As a result, development can be slowed while these communications take place so that all of the developers are working with the same master version of the source code at any one time.

SUMMARY

One aspect of the subject matter discussed herein provides a method for integrating proposed changes to a source code with a master version of the source code, the proposed changes being generated by one or more users of client computing devices and the master version being resident on a server computing system remote from the client computing devices. In this method, proposed changes are transmitted from the client devices to the server system and the proposed changes are integrated into the master version using integration/conflict resolution software resident on the server system. Any unresolved conflicts among the proposed changes and the master version after automatically integrating the proposed changes into the master version are identified and a communication from the server system to the client devices notifies them that there are unresolved conflicts and includes an executable portion, such as a link, that enables a user of a client device to launch an input/output interface on a display component associated with the client device. The client device user employs the interface to transmit over the network commands from the client device to the integration/conflict resolution software resident on the server system to attempt to resolve the unresolved conflicts. Also described and claimed herein are a client computing device that effects client-side method aspects and a server system that effects server-side method aspects.

By virtue of the method and apparatus disclosed and claimed herein, all of the teams developing branches of a particular source code can integrate proposed changes to a master version of the code resident on a server system and resolve conflicts without necessarily requiring extended collaboration among the team members. One of the important features of the resolution techniques described herein is the use of an input/output interface, in preferred form a window launched on the display of the client device, via which the client device user directly interacts with integration/conflict resolution software resident on the server system to attempt to resolve manually conflicts that could not be resolved automatically. Only if the individual developers (client device users) are unable to resolve conflicts in this way are they required to collaborate further, thus saving time and effort toward the final development of the source code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The objects of the subject matter discussed herein will be better understood from the detailed description of embodiments which follows below, when taken in conjunction with the accompanying drawings, in which like numerals and letters refer to like features throughout. The following is a brief identification of the drawing figures used in the accompanying detailed description.

One skilled in the art will readily understand that the drawings are schematic in many respects, but nevertheless will find them sufficient, when taken with the detailed description that follows, to make and use the claimed subject matter.

DETAILED DESCRIPTION

Figure 1:
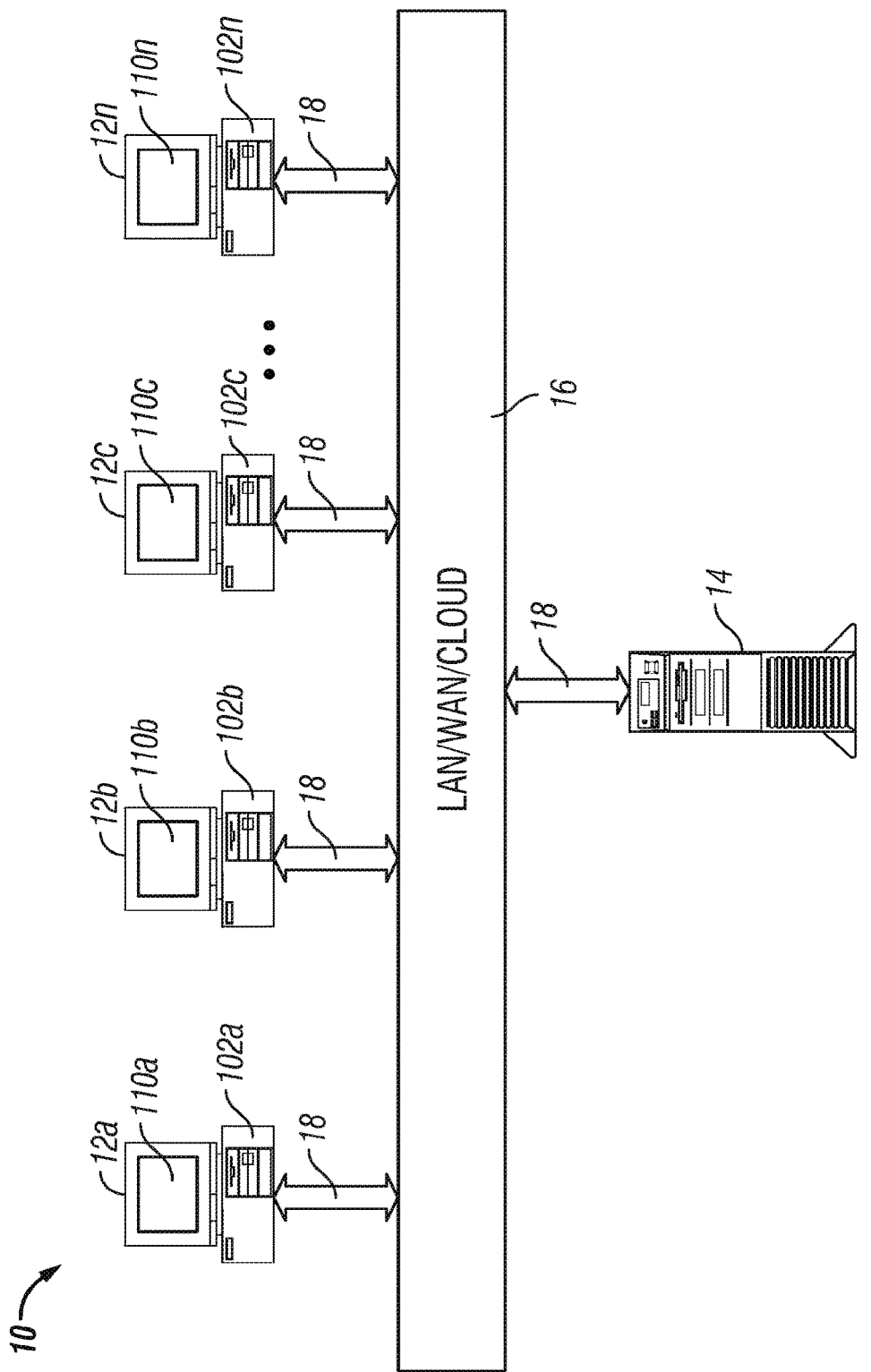
FIG. 1 depicts an example of a system with multiple client workstations connected over a network to a server computer for implementing the integration procedures discussed and claimed herein.

FIG. 1 schematically illustrates a system 10 that can implement the integration and conflict resolution procedures and methods discussed and claimed herein. The system 10 includes a plurality of client workstations 12a, 12b, 12c, . . . , 12n. In a typical implementation, each workstation 12 is used by a software developer to write lines of computer source code, as discussed further below in connection with FIG. 2. The workstations 12 are networked in a client relationship with one or more server computers, represented schematically and collectively by the server 14. The operation and structure of the server(s) are discussed in more detail below in connection with FIG. 3. The network 16 can be a local-area network (LAN), a wide-area network (WAN), or the server computer 14 can be part of a cloud service accessible over the Internet. The arrows 18 represent the connections of the client workstations 12 and the server computer 14 to the network 16, and indicate that communications can be both to and from the workstations and the network, and both to and from the server computer and the network.

It will be appreciated that the architecture of the system 10 will depend largely on the size of the task at hand. A small software code writing project might utilize a LAN-based system in which all of the individual client workstations 12 are within a single facility. Alternatively, the system might utilize, say, a corporation-wide WAN-based architecture so that it can be used for software code development projects of various sizes and complexity. In addition, the system can be cloud-based, with different server computers performing different tasks in a fashion well known to those skilled in the art. Or the system can be any combination of these or other architectures now known or developed in the future. The salient point is that the principles of the integration techniques covered by the this discussion and the claims appended hereto is not confined to implementation using any particular system architecture.

Figure 2:
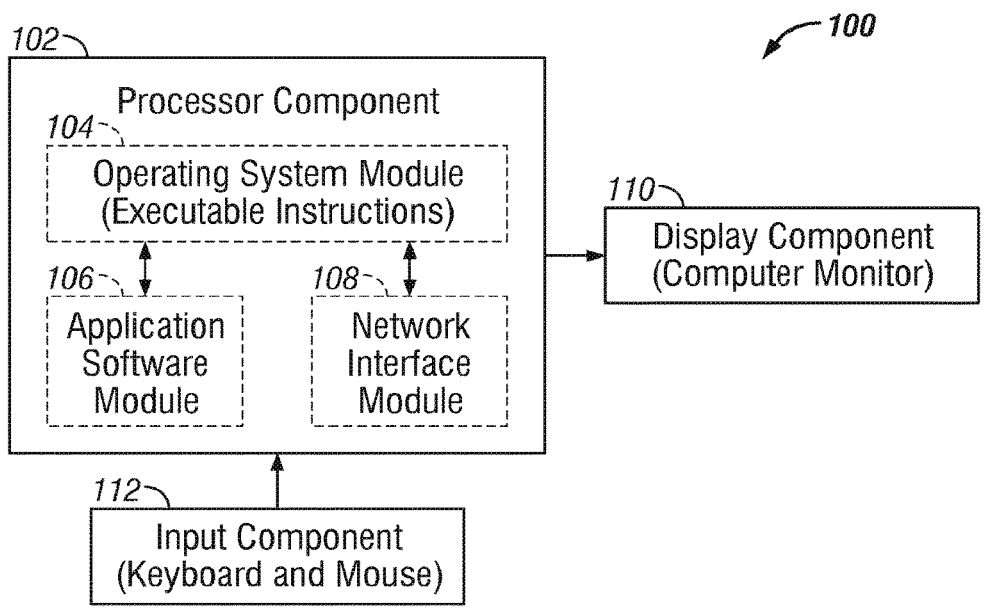
FIG. 2 is a schematic diagram of components of a client workstation that can be used in the system depicted in FIG. 1.

FIG. 2 is a schematic representation of a developer workstation such as a client workstation 12 shown in FIG. 1. In FIG. 2 the workstation is implemented using a personal computer 100 that can store information and executable instructions thereby to carry out operations described herein. It comprises a processor component 102 that includes an operating system module 104. The operating system module is typically stored on a non-transitory computer storage medium or device such as a hard drive (not shown), and is embodied in computer executable instructions that are executed by the processor component 102. The processor component also includes an application software module 106 or the like stored on the hard drive or on another storage device/computer storage media included in the computer 100 to perform the functions described herein in response to user input and to commands received over the network 16. The computer 100 also includes a network interface module 108 that connects to the network 16 shown in FIG. 1. The network interface module 108 is typically a combination of firmware and software that enables the operating system module to send and receive instructions and information over the network 16, as indicated by the arrows 18 in FIG. 1. The network interface module 108 can be embodied in a conventional firmware/software device and can be readily implemented by one skilled in the art without further explanation herein.

The computer 100 further includes a display component 110, such as a computer monitor, and an input component 112. In a typical implementation this component will comprise a conventional pointing device such as a mouse and a keyboard, although many other input components or apparatus could be used, such as a touch screen activated by a user's hand or a pen, voice commands, and the like. A typical operational paradigm for the computer 100 involves a graphical user interface that is displayed on the display component 110 under the control of the operating system module 104. A user interacts with the graphical user interface using the input component 112 to enter commands to the operating system module 104 to execute instructions that initiate various actions, such as accessing the network 16 via the network interface module 106, launching applications, and otherwise controlling the operation of the computer system 100.

As used in this description, the terms "component," "module," "system," "apparatus," "interface," or the like are generally intended to refer to a computer-related entity or entities, either hardware, a combination of hardware and software, software, or software in execution, unless the context clearly indicates otherwise. For example, such a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer (device) and/or distributed between two or more computers (devices).

As used herein, a "computer storage medium" can be a volatile or non-volatile, removable or non-removable medium implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer The computer 100 described here is meant to be only one example of an electronic device for effecting the integration/conflict resolution methods described herein. It is intended that "electronic device" be considered broadly as including any such device (or any physical or logical element of another device, either standing alone or included in still other devices) that is configured for communication via one or more communication networks such as those described herein and that is responsive to user inputs. While the computer 100 will typically be implemented by a desktop computer familiar to those skilled in the art, other electronic devices may be adaptable to effect the methods to be described, examples of which electronic devices could include, but would not be limited to, mobile phones, personal digital assistants, smart phones, laptop and desktop computer systems of any configuration or implementation, personal media players, image or video capture/playback devices, devices temporarily or permanently mounted in transportation equipment such as planes, trains, or wheeled vehicles, set-top boxes, game consoles, stereos, digital video recorders/players, and televisions.

Figure 3:
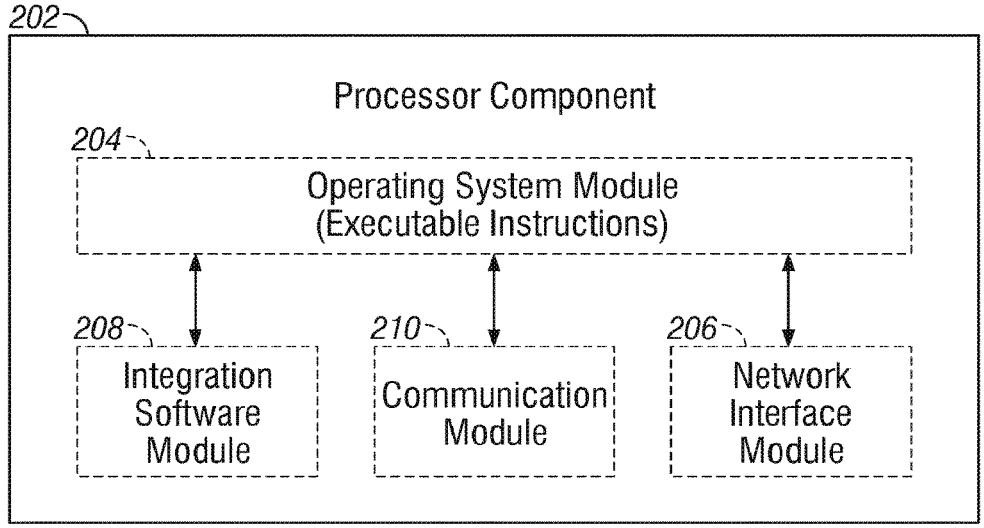
FIG. 3 is a is a schematic diagram of components of a server system that can be used in the system depicted in FIG. 1.

FIG. 3 is a more detailed schematic representation of the server computer or computers 14 shown in FIG. 1. In FIG. 3 the server is implemented using a computer system 200 such as a PC-compatible computer with a processor component 202 having an operating system module 204 running a windowing environment such as Microsoft Corporation's Windows NT® server software. It will be appreciated that the methods described herein can be effected using any other suitable software, from any source or vendor, that is capable of performing the functions described in more detail below. The server system 200 also includes a network interface module 206 that connects to the network 16 shown in FIG. 1. The network interface module 206 is similar to the module 106 associated with the computer 100, in that it is typically a combination of firmware and software that enables the operating system module 204 to send and receive instructions and information over the network 16, as indicated by the arrows 18 in FIG. 1. As such the network interface module 206 can be embodied in a conventional firmware/software device and can be readily implemented by one skilled in the art.

The server system 200 further includes an integration software module 208 that integrates changes/additions to a source code compilation made via a workstation computer 100 with the master version of the source code. As noted above, an example of commercially available integration software is Microsoft Corporation's Team Foundation Server. The server system 200 further includes a communication module 210 that receives instructions from the client workstations 12a, . . . , 12n, and sends instructions to the workstations, over the network 16 (via the network interface modules 108 and 206), executed by the instructions resident in the respective operating system modules 104 and 204. Among the functions of the communication module 210 is to generate emails to client workstation computers 100 and instructions for transmission to one or more client computers 100 to launch an integration interface window on the monitor 110, as described in more detail below.

It will be appreciated that the server system 200 is a schematic representation, and need not be implemented in a single device, nor does FIG. 3 depict all of the components of a server system that can be used to implement the methods described herein. For example, the integration software module can include a storage module on which the master version of the source code compilation is maintained, or the master version may be kept at a separate location in the cloud. Such an implementation could be used with a combination local area network having the client workstations connected with a local server, and the source code compilation resident in the cloud. In addition, other combinations and arrangements for implementing the server system 200 can likewise be employed to effect the subject matter described and claimed herein, and nothing in the present description of an embodiment of such a system should be taken as limiting the scope of the claims appended hereto.

Furthermore, the subject matter described and claimed herein may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disc, floppy disc, magnetic strips . . . ), optical discs (e.g., compact disc (CD), digital versatile disc (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Figure 4:
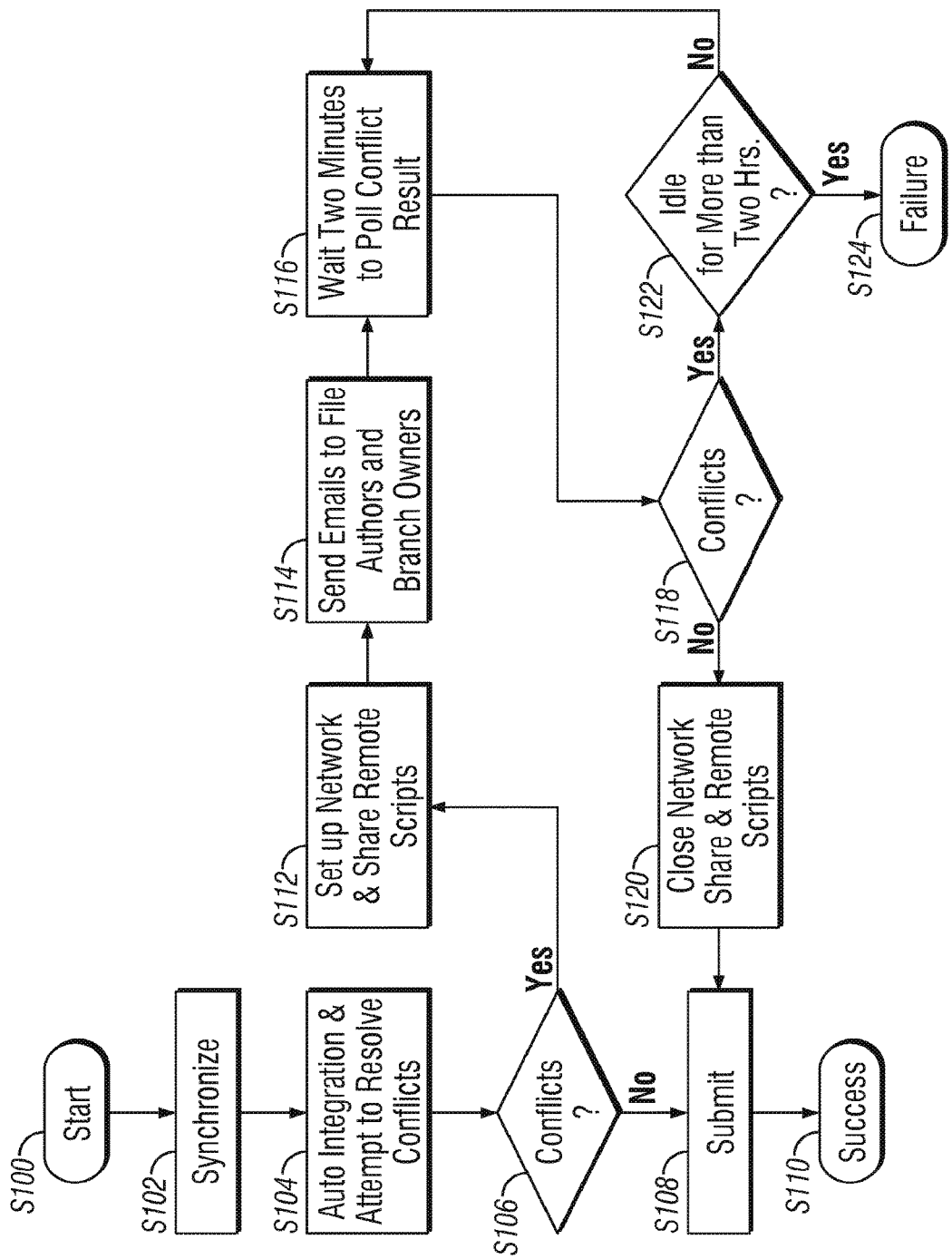
FIG. 4 is a flowchart depicting an embodiment of a method for incorporating into a master version of a code changes proposed by the code developers and resolving potential conflicts that could be caused by such changes.

FIG. 4 is a flowchart depicting an overview of a method of integrating proposed changes to a master version of computer code and resolving any conflicts created by the proposed changes. The method starts at step S100, representing the initiation of an integration operation by the software module 208 of the server system 200 to integrate with a master version of the source code any changes/additions to the source code proposed by a user of a client workstation computer 100. There are many ways to initiate this reverse integration process by which developers' proposed changes are integrated into the source code master version. In this embodiment it is assumed that a reverse integration process is automatically initiated every 24 hours at the same time of day. In addition, it is further assumed that all of the users of the client workstation computers 100 have uploaded their proposed changes to a storage location maintained by the server system 200. It will be understood that the proposed changes can be stored in a memory module (not shown) associated with the server system, and can be on the same server computer as the components shown in FIG. 3, or elsewhere, such on a location in the cloud.

Step S102 is a synchronization operation performed by the integration software module 208, to make all of the proposed changes received from all of the client computers 100 in the past 24 hours available for integration with the master version. The server operating system module 204 then runs the integration software, as represented by step S104, which, as discussed above, integrates all of the proposed changes into the master version of the code being developed and attempts to automatically resolve any conflicts among the proposed changes and the master version or among the proposed changes themselves. In step S106 the presence or absence of conflicts is determined. If no conflicts exist after integration, the process proceeds to step S108. in which the new master version is submitted for transmission to the client workstations (so-called "forward integration") and for storage in readiness for the next reverse integration operation that will start with step S100. Step S110 deems the reverse integration a success and sends emails to the client workstations indicating that a new master version of the code being developed is available.

If step S106 indicates the presence of conflicts that were not able to be automatically resolved, the process proceeds to step S112, where the server system 200 initiates the conflict resolution process described in more detail below in connection with the flowchart depicted in FIG. 5. This involves setting up a networking protocol that will enable the various client workstations 12, comprising the computers 100, to communicate with the server system 200. This protocol enables the client computers 100 to share with the remote server system 200 communications ("scripts") that provide commands to the server system operating system module 204. An example of such a protocol is Microsoft Corporation's Windows Communication Foundation application programming interface that supports distributed computing (in this case, among the various client workstations 12 and the server 14) over the network 16. However, any protocol capable of enabling the exchange of user commands and responses between and among the workstations and the server will suffice. Once the network is set up in step S112, the server automatically sends emails to client workstations to initiate conflict resolution as discussed in detail further below in connection with FIG. 5. In FIG. 4, the notation "file author" refers to the author of proposed changes to a particular section or "branch" of the code under development. "Branch owner" refers to the person in charge of developing that particular branch of the code. Several individual authors may be on a team that reports to a branch owner. There may be a further hierarchical organization, in which there are subbranches, in which case emails are preferably sent to everyone involved with the branch in question. In that way, those responsible for the branches and subbranches are made aware of conflicts that require resolution.

Step S116 represents the beginning of the conflict resolution process described in connection with FIG. 5. The integration software module 208 has generated a list of the conflicts that require resolution and removes each conflict from the list as it is resolved. The integration software is run to check the list periodically to determine if any conflicts remain. In the present embodiment, the list is polled in this manner every two minutes, but other time periods may be used, as well. The process then proceeds to step S118 to determine the results of the polling. If all conflicts have been resolved, the process proceeds to step S120, where the network is closed, after which the process proceeds to step S108, discussed above.

If a poll of the conflict resolution operation reveals that conflicts remain, the process proceeds to step S122. This step determines if there has been any conflict resolution activity by any client workstation within a predetermined time period, which in this embodiment is set to two hours. If conflict resolution activity is continuing, the process returns to step S116 to await the next poll. If, however, step S122 determines that the predetermined time period has elapsed, the server assumes that conflict resolution has failed and proceeds to step S124. In a typical embodiment, this step will generate another email to those involved indicating that a proposed change to the master code version has raised unresolved conflicts requiring further action.

Figure 5:
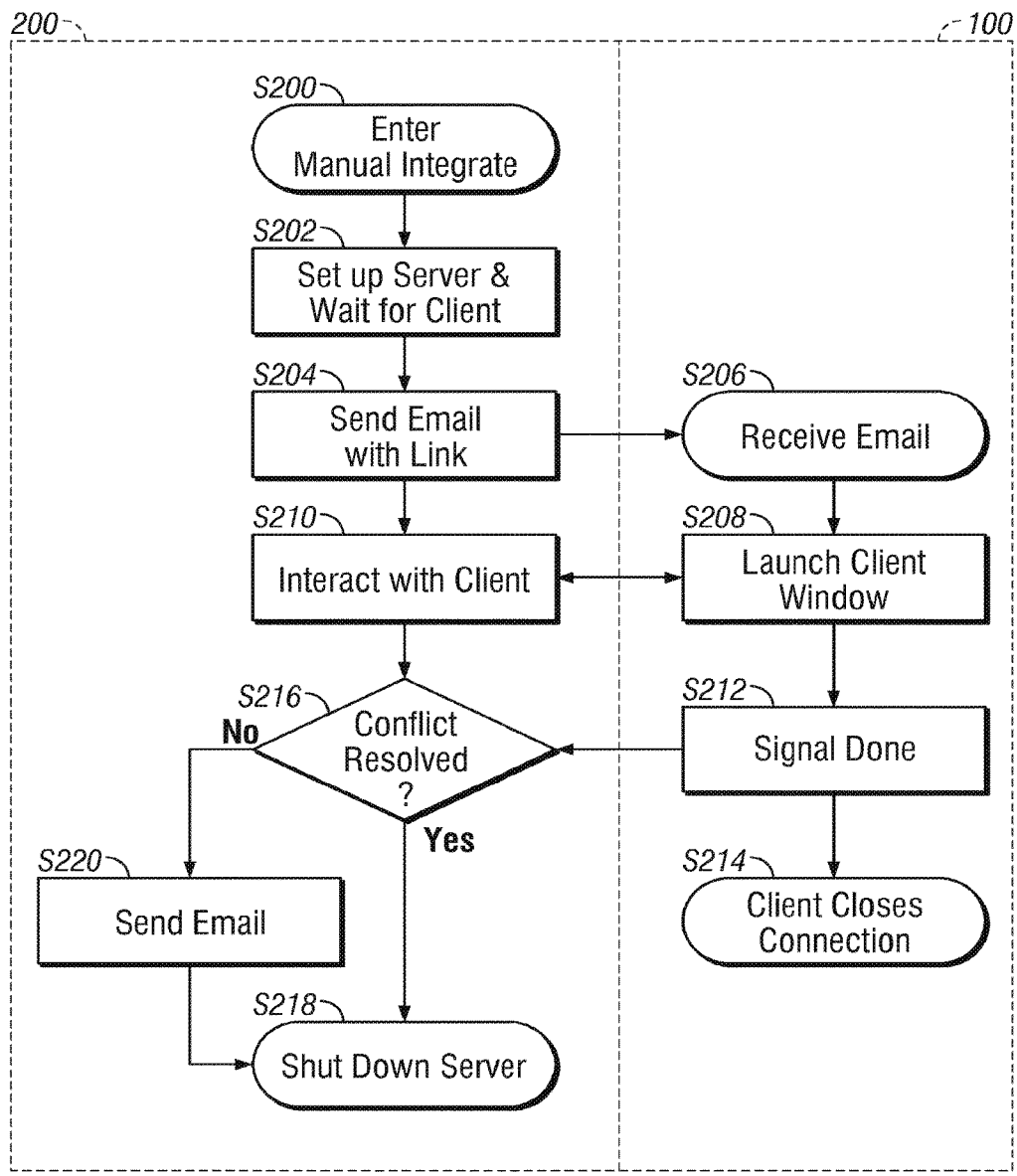
FIG. 5 is a flowchart depicting the processes performed using the system shown in FIG. 1 to effect the integration/conflict resolution method according to the flowchart in FIG. 4.

FIG. 5 is a flowchart that depicts various functions of a representative client workstation 100 and the server system 100 in a conflict resolution operation. In step 200 the server system begins a reverse integration operation and proceeds to step S202 to set up the server network and wait for a response from one or more client computers 100. That is, steps S200 and S202 correspond generally to step S112 in FIG. 4. In step S204 the server system's communication module 210 automatically generates an email to one or more client computers 100.

This automatically generated email includes a variety of information. One of its important aspects is that it includes an executable portion or link that when activated will automatically launch on the client computer monitor 110 the window shown in FIG. 6, the purpose of which is described in more detail in connection with that figure. The client computer receives the email in step S206 and in step S208 the user of the client computer opens the email and uses the input component 112 to activate the link (as by clicking on it with a mouse). As noted, the link is configured to automatically send an instruction to the server system's communication module 210 that results in launching a window on the client computer's monitor. As described in detail in connection with FIG. 6, this window enables the user of the client computer to interact directly with the server's operating system module 204 and integration software module 208 to manually resolve conflicts that the integration software identified in step S104 in FIG. 4. In addition to the link, this email identifies the branch or subbranch of the code that has the conflict(s), the date and time, the recipient's name (that is, the author of the proposed change that is causing the conflict), and the names of the manager(s) in charge of the subbranch and/or branch in question. The body of the email will include text that indicates the purpose of the email. An example of such text would read:

ATTENTION: This is an auto generated email alerting you to merge conflicts in [name of branch]. Please resolve the conflicts to help us continue the integration process.

Please follow the instructions below to resolve conflict:
1) click here [indicating an executable link] to open a command prompt;
2) follow the instructions on the screen to resolve the problems.

The email would preferably further include additional text again identifying the branch under consideration and listing the files in which the conflicts have been identified and the author of the proposed changes to the file (normally the recipient of the email).

On the server side, the process proceeds to step S210, which indicates that the server system 200 can interact with the client computer 100, through the window that has been launched on the computer monitor 110. It will be appreciated that during this interaction the server system performs steps S116, S118, and S122, shown in FIG. 4. Once the client computer user has completed a conflict resolution operation, he or she inputs a command (using the input component 112) indicating that these operations have been completed, represented by step S212. This generates a Done signal that is transmitted to the server system, while on the client side the client computer proceeds to step S214 to automatically close the window that was launched in step S206.

On the server side, the Done signal causes the server system to proceed to step S216, where a determination is made as to whether or not all conflicts identified in step S106 (FIG. 4) have been resolved. Step S216 corresponds to step S118 in FIG. 4, so that if the determination is that no conflicts remain, the server system 200 proceeds to step S218 (corresponding to steps S108 and S110 in FIG. 4).

However, if conflicts remain after expiration of the predetermined time period established in step S122, the server proceeds to step S220 and automatically generates an email to the client workstations of the interested parties, typically the same recipients of the email sent in step S204. As noted above in connection with step S124, this email will typically indicate that a proposed change to the master code version has raised unresolved conflicts requiring further action. The process then proceeds to step S218, where the server session is terminated.

Figure 6:
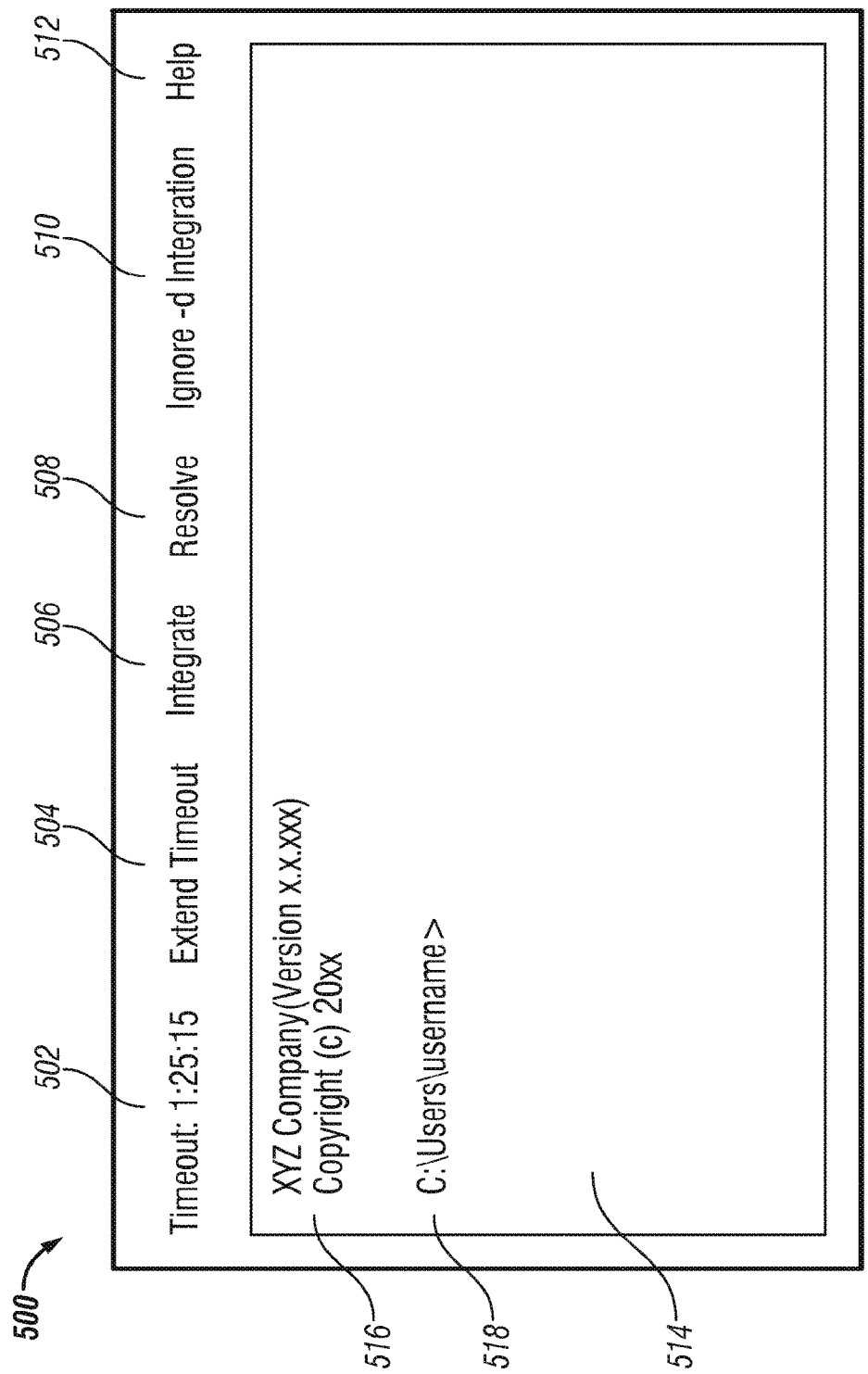
FIG. 6 is a window that is launched on a client workstation monitor pursuant to the flowcharts in FIGS. 4 and 5.

FIG. 6 illustrates one embodiment of a window 500 that is launched on a client workstation monitor 110 in the step S208 in FIG. 5 to provide an input/output interface for the client computer user. The window includes at its top margin a time-out indicator 502 that informs the user how much time he or she has remaining until the window is automatically closed. It also includes a number of actuatable portions in the form conventionally known as "buttons," including an "Extend Timeout" button 504, an "integrate" button 504, a "resolve" button 508, an "ignore -d integration" button 510, and a "Help" button 512. In a lower input/output area 514 the window includes optional text 516 that identifies the owner of any intellectual property rights in the window configuration and/or the software used to launch it and execute commands entered therein, and a portion, commonly known as a "command prompt," that accepts text commands entered following the ">" symbol. In a typical implementation, this window executes a software application that interprets entered text commands and performs predetermined operations in response to the commands. It is an important feature of the method of the present embodiment that the commands entered at a client workstation are executed at the server. That is, even though the window is opened on the client computer monitor, and accepts inputs from the client computer, the client user in fact is entering commands that are executed by the integration software module 208 on the server system 200.

Considering the window 500 in more detail, the time-out indicator 502 begins at 2:00:00 (2 hours, 0 minutes, and 0 seconds) when the window is launched. It then counts down on a second-by-second basis, thus indicating to the client computer user how much time remains to resolve the identified conflicts. (Note that this time period is not related to the time period in step S122 in FIG. 4.) If the user requires more time, he or she can activate the "Extend Timeout" button 504 (using the computer's input component 112), which will increment the time-out indicator by a predetermined amount. A typical extension of time is 30 minutes, although other periods may be used as well. In addition, it is preferable to limit the number of times the timeout period can be extended so that any conflicts that have not been resolved in that time can be addressed by direct communications among the developing team members prior to the next automatically initiated integration/conflict resolution operation (step S110). If multiple workstations are using the system simultaneously, the total number of extensions of time will be limited to an absolute number, such as three (90 minutes if each extension is for 30 minutes), again so that the conflict resolution operation has a known ending and any necessary direct collaboration among the system users can be addressed in a timely fashion. Once the ultimate time limit has been reached, that is, after all available extensions have been requested, the "Extend Timeout" button is rendered inoperable (and is likewise displayed in a different manner, such as being "grayed out," to indicate to the user that further extensions are not available).

To begin the client-controlled conflict resolution process the user clicks on or otherwise activates the "integrate" button 506, which automatically enters following the command prompt 518 the proper command to the server system integration software module 208. This initiates the software's integration procedure that was performed in step S104 in FIG. 4. The integration software then returns to the client computer 100 over the network 16 a listing of the conflicts that were determined in step S104. The client user then activates the "resolve" button 508, for example, by clicking on it using a mouse, to permit the client user to begin an attempt to resolve the conflicts that were identified by the attempted integration. This is an interactive process in which the client user provides instructions to the integration software by typing them after the command prompt and causing them to be transmitted to the server system 200 (such as by pressing an "Enter" key on the computer keyboard after entering the text command). These commands are predetermined and are entered in specific syntax understood by the server computer. For example, a command could instruct the server to resolve an issue with the integration by overwriting a line of the master version of the code with the proposed change that is creating the conflict, as identified in the "integrate" operation. Or conversely, the user could enter a command that instructs the server software to ignore the proposed change.

This process continues until the client user has resolved all of the conflicts, or has determined that one or more of the conflicts requires further collaboration with other developers of the code to resolve. If all of the client users that were logged on have resolved all of the conflicts identified in step S106 in FIG. 4, then step S118 determines that no conflicts remain, and the process proceeds to step S108, as discussed above. As noted above, unresolved conflicts are identified by iteratively running the integration/conflict resolution software at predetermined intervals (see steps S116 and S118 in FIG. 4). Thus, if an iteration determines that no conflicts remain, the process proceeds to step S108, as discussed above. Likewise, when the time period discussed above times out, the window automatically closes and any user inputs toward resolving conflicts are not saved and are lost, which thereby preserves the integrity of the master version of the code. If the client computer becomes inoperable for any reason, and thus makes it impossible for the user to indicate that he or she has completed the attempted conflict resolution process, the communication module 210 of the server system 200 waits for a time, such as five minutes, for the client to reconnect to the server system. If the client does not reconnect within that time period, the integration software considers the client to have logged off without resolving the detected conflicts.

The "ignore -d integrate" button 512 enables the client user to instruct the system to ignore any files that were deleted during the conflict resolution process. More specifically, as a client user works on resolving conflicts subsequent to activating the "resolve" button 508, he or she may direct the integration software module 208 to delete certain files or lines of code from the master version. These files are marked with a "-d" flag and stored by the integration software module. If a client user has deleted any files or code from the master version during the conflict resolution process, he or she must activate the "ignore -d integration" button upon successful completion of a conflict resolution session. If none of the client users in a conflict resolution session activates the "ignore -d integration" button, the server will deem conflicts to remain in step S118 if any user has deleted any code from the master version. If any user activates the "ignore -d integration" button, and the only conflicts remaining are because of deleted files or code, then step S118 in FIG. 4 determines that no conflicts remain, and the process proceeds to step S108, as discussed above.

Finally, the "Help" button 512 can be activated at any time during a conflict resolution session to open a separate window that the user can employ to search for information to assist in the conflict resolution process. As is conventional, help topics will typically be organized by context and searchable by text.

As will be apparent from the above description, the system 10 described herein enables all of the teams developing branches of a particular source code to integrate proposed changes to a master version of the code resident on a server system and resolve conflicts without necessarily requiring extended collaboration among the team members. Conventional software resident on the server system identifies conflicts that it cannot resolve automatically. In a preferred embodiment of the methods, systems, and devices described herein, the server system automatically generates emails to remote individual users that notifies them that their proposed changes have resulted in conflicts with the master version of the code. Clicking on a link in the email launches a window on the email recipient's computer. The window enables the user to directly interact with the integration/conflict resolution software resident on the server system to attempt to resolve manually the conflicts that could not be resolved automatically. Only if the individual developers are unable to resolve conflicts in this way are they required to collaborate further, thus saving time and effort toward the final development of the source code.

Unless specifically stated, the methods described herein are not constrained to a particular order or sequence. In addition, some of the described method steps can occur or be performed concurrently. Further, the word "example" is used herein simply to describe one manner of implementation. Such an implementation is not to be construed as the only manner of implementing any particular feature of the subject matter discussed herein. Also, functions described herein as being performed by computer programs are not limited to implementation by any specific embodiments of such program.

Although the subject matter herein has been described in language specific to structural features and/or methodological acts, it is to be understood that the subject matter of the appended claims is not limited to the specific features or acts described above. Rather, such features and acts are disclosed as sample forms of corresponding subject matter covered by the appended claims.

What is claimed is:

1. A method for integrating proposed changes to source code, the method comprising:
   receiving, by a server computing device, the proposed changes from a client computing device;
   partially integrating, by the server computing device, the proposed changes into a version of the source code;
   identifying at least one unresolved conflict between the proposed changes and the version after the partial integration of the proposed changes into the version;
   sending a communication from the server computing device to the client computing device over a network, the communication including information regarding the at least one unresolved conflict and a reference to a source code integration application;
   receiving, from the source code integration application, commands associated with the unresolved conflicts; and
   executing, by the server computing device, the received commands as part of a process of completing integration of the proposed changes into the version.

2. The method of claim 1, wherein the source code integration application comprises a window with a command portion into which commands to be executed by the server computing device can be entered and a user actuatable element that is associated with a predefined command that is to be performed in response to an actuation of the user actuatable element.

3. The method of claim 2, wherein the predefined command causes the source code integration application to display the unresolved conflicts.

4. The method of claim 2, wherein:
   the predefined command causes the client computing device to initiate an interactive conflict resolution operation on the server computing device; and
   the interactive conflict resolution operation enables entry of commands to cause revision to the proposed changes, to the version, or both.

5. The method of claim 4, wherein another predefined command serves as an instruction to ignore any portion of the version that was deleted as part of the interactive conflict resolution operation.

6. The method of claim 2, wherein:
   the source code integration application is to close the window at a predetermined time after the source code integration application is launched and is to transmit a communication to the server computing device as an indication of one or more unresolved conflicts.

7. The method of claim 1, further comprising:
   receiving an indication from the client computing device that there are unresolved conflicts; and
   in response to the indication, transmitting another communication to the client computing device, to another client computing device, or to multiple client computing devices.

8. The method of claim 1, further comprising:
   receiving, by the server computing device, additional proposed changes from another client computing device, wherein
   partially integrating the proposed changes includes at least partially integrating the additional proposed changes into the version.

9. A server computing device, comprising:
   a storage device configured to store source code;
   a network interface configured to interface the server computing device to a plurality of client computing devices over a network; and
   at least one memory and at least one processor respectively configured to store and execute computer executable instructions, including for causing the server computing device to perform operations, the operations including:
      partially integrating proposed changes received from a client computing device via the network interface into the source code stored in the storage device;
      identifying one or more unresolved conflicts between the proposed changes and the source code stored in the storage device; and
      transmitting a communication to at least one of the plurality of client computing devices, the communication identifying at least one unresolved conflict, and the communication including a reference for launching a source code integration application.

10. The server computing device of claim 9, wherein the storage device is also configured to store a revised version of the source code in response to resolution of the identified one or more conflicts, wherein at least some of the identified one or more conflicts were resolved in response to input to the server computing device received via the source code integration application.

11. The server computing device of claim 9, wherein the operations also include:
transmitting another communication to the at least one of the plurality of client computing devices as a notification that at least one of the identified one or more conflicts was not resolved in response to instructions received from the at least one of the plurality of client computing devices.

12. The server computing device of claim 10, wherein the operations also include:
deleting a portion of the source code in response to an instruction from the at least one of the plurality of client computing devices, wherein the portion of the source code is associated with a flag, and wherein the notification is transmitted unless the server computing device receives an instruction from the at least one of the plurality of client computing devices to ignore the flag.

13. The server computing device of claim 9, wherein the source code integration application comprises a window with a command portion into which commands to be executed by the server computing device can be entered and a user actuatable element that is associated with a predefined command that is to be performed in response to an actuation of the user actuatable element.

14. The server computing device of claim 9, wherein the operations also include:
receiving an indication from a client computing device that there are unresolved conflicts; and
in response to the indication, transmitting another communication to the client computing device, to another client computing device, or to multiple client computing devices.

15. A computer-readable storage device having instructions stored therein for causing a computing device to perform operations, the operations comprising:
receiving proposed changes to a version of source code stored on a server computing device; and
detecting conflicts during an integration of the proposed changes into the version of the source code stored on a server computing device;
transmitting a communication to a client computing devices the communication identifying at least one unresolved conflict, and the communication including a reference for launching a source code integration application.

16. The computer-readable storage device of claim 15, wherein the source code integration application comprises:
a window with a command portion into which commands to be executed by the server computing device can be entered; and
an actuatable element that is associated with a predefined command that is to be performed in response to an actuation of the actuatable element.

17. The computer-readable storage device of claim 16, wherein the predefined command causes the source code integration application to display the detected conflicts in the window.

18. The computer-readable storage device of claim 16, wherein:
the predefined command causes the computing device to initiate an interactive conflict resolution operation on the server computing device;
the interactive conflict resolution operation enables entry of commands to cause revisions to the proposed changes, to the master version of the source code, or to both; and
the source code integration application also receives communications that are indicative of a result of the revisions from the server computing device.

19. The computer-readable storage device of claim 16, wherein another predefined command serves as an instruction for the server computing device to ignore any portion of the version of the source code that was deleted as part of the interactive conflict resolution operation.

20. The computer-readable storage device of claim 15, wherein the source code integration application also displays communications from the server computing device that are responses to commands transmitted from the computing device.

* * * * *